US010963850B2

(12) United States Patent
Aldridge et al.

(10) Patent No.: US 10,963,850 B2
(45) Date of Patent: Mar. 30, 2021

(54) INTER-NETWORK REMOTE ASSIST (71) Applicant: NCR Corporation, Duluth, GA (US)

(72) Inventors: John Aldridge, Lehi, UT (US);
Marreddy Thumma, Draper, UT (US)

(73) Assignee: NCR Corporation, Atlanta, GA (US)

(*) Notice: Subject to any disclaimer, the term of this patent is extended or adjusted under 35 U.S.C. 154(b) by 569 days.

(21) Appl. No.: 14/672,988

(22) Filed: Mar. 30, 2015

(65) Prior Publication Data
US 2016/0292655 A1 Oct. 6, 2016

(51) Int. Cl.
G06Q 20/18 (2012.01)
G06Q 20/10 (2012.01)
G06Q 20/42 (2012.01)

(52) U.S. Cl.
CPC ......... G06Q 20/1085 (2013.01); G06Q 20/18 (2013.01); G06Q 20/425 (2013.01)

(58) Field of Classification Search
CPC .................................. G06Q 20/1085
USPC ....................................... 705/35–43
See application file for complete search history.

(56) References Cited

U.S. PATENT DOCUMENTS

| 7,606,767 B1* | 10/2009 | Couper | G06Q 20/105 705/41 |
| 2013/0018788 A1* | 1/2013 | Johnson | G07F 19/201 705/43 |
| 2013/0054468 A1* | 2/2013 | Fuentes | G06Q 20/108 705/64 |
| 2016/0148308 A1* | 5/2016 | Malone | G06Q 40/02 705/35 |
| 2016/0240050 A1* | 8/2016 | Block | G06Q 20/1085 |

OTHER PUBLICATIONS

Application Service Provider Business Model: Implementation on the iSeries server, IBM Redbooks (Year: 2001).*

* cited by examiner

Primary Examiner — Bruce I Ebersman
Assistant Examiner — John A Anderson
(74) Attorney, Agent, or Firm — Schwegman, Lundberg & Woessner (57) ABSTRACT A not-on-us transaction at a Self-Service Terminal (SST) is initiated by a customer. Transaction details indicate that the customer is associated with a remote backend system that is accessible over a different network from that which is associated with the SST. The transaction details are forwarded from the SST to the remote backend system. Remote commands are issued from the remote backend system and translated into native commands of the SST where they are executed on the SST to process the not-on-us transaction.

12 Claims, 4 Drawing Sheets

INTER-NETWORK REMOTE ASSIST

BACKGROUND

More and more customers of enterprises are embracing and using automated Self-Service Terminals (SSTs) to conduct transactions with those enterprises. For example, in the banking industry Automated Teller Machines (ATMs) can now almost entirely complete any transaction a customer is in need of without a teller's physical presence being required.

Moreover, ATMs situated in a bank branch can offer customers real-time assistance while the customers are transacting at the ATMs. The assistance can come in the form of a teller present at the bank branch or can come through remote video link to a remote teller.

However, real-time assistance and other transactions that may be available to customers at a branch associated with their bank are not available to those customers while they are transacting at ATMs not associated with their bank. A customer may be able to check on a balance, deposit a check, and withdraw cash from such ATMs but other more complex transactions (fund transfers, check cashing, etc.) are typically not available at those ATMs.

For example, suppose a customer requests assistance of a remote teller through a video link while transacting at an ATM that is not associated with that customer's bank. Even if the ATM is equipped with the necessary hardware and software resources, the ATM is unable to provide remote teller assistance at the ATM to the customer.

Situations such as these and others actually deter individuals from banking with financial institutions that do not have a prominent presence in the local communities of those individuals. Even larger financial institutions may lack a substantial presence in some communities. Thus, individuals that relocate to such communities are likely to switch their financial institutions to a bank with a prominent presence in their community. This is not a desirable situation for the financial institution that is potentially losing a valued customer.

SUMMARY

In various embodiments, methods and a Self-Service Terminal (SST) for providing inter-network remote assist are presented.

According to an embodiment, a method for providing inter-network remote assist is presented. Specifically, a customer of a system that is external to an SST is identified. At least a portion of a native SST interface to the system is exposed to the system. A remote command received from the system is translated into a native SST command of the native SST interface and the native SST command is executed on the SST on behalf of the customer.

DETAILED DESCRIPTION

Figure 1:
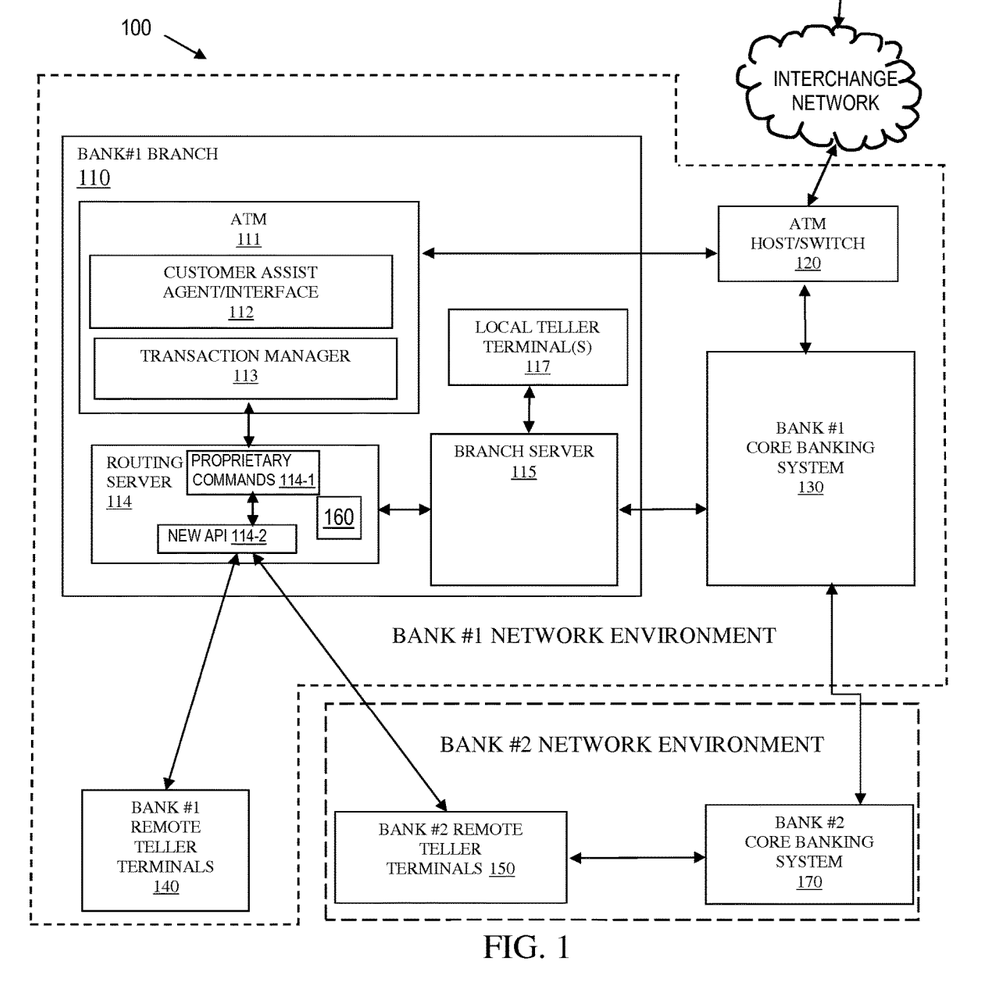
FIG. 1 is a diagram of a banking system providing inter-network remote assist for Automated Teller Machine (ATM) transactions, according to an example embodiment.

FIG. 1 is a diagram of a banking system 100 providing inter-network remote assist for Automated Teller Machine (ATM) transactions, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of inter-network Self-Service Terminal (SST) remote assistance transactions, presented herein and below.

The banking retail system 100 includes a bank #1 network environment and a bank #2 network environment. The bank #1 network environment includes: a bank #1 branch 110, an ATM host/switch 120, a bank #1 core banking system 130, and one or more bank #1 remote teller terminals 140. The remote teller terminals 140 are typically operated by members of the staff of bank #1 to assist customers with transactions at bank #1 ATMs, such as ATM 111. The remote teller terminals 140 may be located at a call center and may serve multiple branches of bank #1.

The bank #1 branch 110 includes an ATM 111 (having a customer assist agent/interface 112 and a transaction manager 113), a routing server 114 (having proprietary commands 114-1, a new Application Programming Interface (API) 114-2, and viewing/logging manager 160, a branch server 115, and one or more local teller terminals 116.

The bank #2 network environment includes one or more bank #2 remote teller terminals 150 associated with various bank #2 ATMs (not shown in the FIG. 1) and a bank #2 core banking system 170. The bank #2 remote teller terminals 150 provide remote assistance for the bank #2 ATMs (not shown in the FIG. 1) and also, as will be described in more detail below, for bank #1 ATMs, such as bank #1 ATM 111.

The bank #1 network environment is under the operational control of the bank that owns the bank #1 core banking system 130. The bank #2 network environment is under the operation control of the bank that owns the bank #2 core banking system 170. The bank #1 network environment and the bank #2 network environment are different communication networks from one another.

During operation, a customer operating the ATM 111 to conduct a financial transaction may request remote assistance before, during, or after the customer's ATM transaction through the customer assist agent/interface 112.

It is to be noted that the ATM 111 is controlled and operated within the bank #1 network environment having a direct communication link or path of links to the bank #1 core banking system 130.

The customer, at ATM 111, is a banking customer of bank #2, which controls and operates bank #2 network environment. So, from the perspective of the bank #1 network environment and from the perspective of the bank #1 core banking system 130, the bank #2 network environment and the bank # core banking system 170 are "foreign" (external, outside the operational control, and remote).

Thus, the customer is attempting to perform what is known as a "not-on-us" financial transaction. This is because the customer is a customer of bank #2 but is performing the transaction at ATM 111 owned and operated by bank #1. So, the financial transaction is referred to as a "not-on-us" transaction from the perspective bank #1. Conversely, if the customer were a customer of bank #1 (which the customer is not for purposes of the running illustrative example), then the transaction would be referred to as an "on-us" transaction (again from the perspective of bank #1 because the transaction occurs at bank #1 branch).

Initial request for remote assistance by the customer at ATM 111 can occur in a variety of manners. For example, the customer assist agent/interface 112 may present a rendered screen on a display of ATM 111 from which the customer can immediately select remote assistance. Here, the customer is then presented with a list of selectable bank options from which the customer selects bank #2.

In another case, the option selected for remote assistance may route to a bank #1 remote teller 140 initially where the customer is asked to show a driver's license for verification and during the remote assistance with bank #1, the bank #1 remote teller 140 causes the remote assistance to be transferred to a remote teller 150 associated with bank #2 for the remainder of the remote assistance session.

In still another situation, when the customer selects a remote assistance option, the customer is then asked to swipe his bank card at ATM 111 from which an identifier for bank #2 is acquired.

In still another scenario, the customer inserts his/her ATM (which is bank #2 card) into ATM 111, the magnetic card strip is read and the customer is presented with an option of performing an unassisted ATM transaction (that is, a conventional ATM transaction), or a transaction with remote assistance for bank #2).

If the conventional ATM transaction is selected then the transaction proceeds as normal, so will not be described herein. In this example, the customer decides to request remote assistance for the transaction.

In the ATM card scenario, the ATM card includes an identifier that identifies the customer's bank #2. The identifier is read by the ATM 111 and the identity of bank #2 is ascertained (in this example using a financial institution lookup table). This indicates that the transaction at the ATM 111 is going to be a not-on-us transaction.

The customer assist agent/interface 112 presents on a screen rendered to a display of the ATM 111 an option for remote assistance for the not-on-us transaction being conducted by the customer. If the customer selects the option for remote assistance, the customer assist agent/interface 112 sends the request to the transaction manager 113 along with an indication that it is a request for a not-on-us (foreign) transaction for remote assistance from bank #2 (based on the bank #2 identifier obtained from the customer bank card for bank #2 swiped at ATM 111).

The transaction manager 113 relays the remote assistance request (not-on-us or foreign transaction) to the routing server 114. The proprietary commands 114-1 convert the remote assistance request into one or more high-level new commands recognized in the new API 114-2. The new API 114-2 commands are recognized by bank #2 remote teller terminals 150 located within the bank #2 network environment.

A bank #2 teller terminal 150 takes ownership of the remote assistance request and interacts with routing server 114 through the new API 114-2 commands.

The new API 114-2 exposes functionality of the Bank #1 ATM 111 and provides the ability for the bank #2 remote teller terminal 150 to issues high-level commands through the new API 114-2 commands that are provided to the proprietary commands 114-1 where they are converted into commands recognized by bank #1 ATM 111. Some exposed ATM 111 commands may include: dispense currency, accept a check deposit, establish a remote video session, and any other financial ATM commands that may be acceptably permitted by bank #1 on its ATM 111.

The proprietary commands 114-1 sent from the bank #2 remote teller terminal 150 is routed to the ATM 111 for conducting the not-on-us (foreign transaction) associated with bank #2 within the bank 31 network environment. Accordingly, a remote teller for bank #2 can operated the bank #2 remote teller terminal 150 to remotely assist over an inter-network connection (bank #1 network environment and bank #2 network environment) a customer during a financial transaction and issue commands through the new API 114-2 that are converted by the proprietary commands 114-1 and executed by the transaction manager 113.

So, a customer can use the customer/assist agent interface 112 to establish a remote communication session (video, text, and/or audio) with a remote teller of bank #1 while operating ATM 111. During this remote communication session, the remote teller operating bank #2 remote teller terminal 150 can issue commands that are processed by bank #1's transaction manager 113 on bank #1's ATM 111.

Because any financial transaction conducted by the remote teller is processed as a not-on-us transaction (foreign transaction), bank #1 needs the capability to reconcile and collect any funds that are dispensed during the not-on-us transaction such that the bank #1 core banking system 130 can collect any dispersed funds from the bank #2 core banking system 170.

Conventionally, not-on-us transactions at an ATM process through the ATM host/switch 120 where communication between bank #1 branch 110 is routed at the host/switch 120 through an interchange network to foreign banks, such as bank #2. These conventional transactions may still occur with the teachings presented herein. However, when the customer selects a remote assist option with bank staff from the customer's own bank (which is not conventionally available even for ATMs that have a remote teller option) through the customer assist agent/interface 112, the remote assistance with the bank #2 remote teller is established and the not-on-us transaction processes as discussed in the novel manners discussed above. Therefore, when this situation occurs, the viewing/logging manager 160 provides a mechanism for bank #1 to monitor and reconcile the not-on-us transaction that proceeds at ATM 111 over an inter-network connection between the bank #1 network environment and the bank #2 network environment.

The viewing/logging manager 160 provides a logging, reporting, and real-time viewing of the not-on-us transaction within the bank branch #1 110. This permits the bank #1 core banking system 130 to request, receive, and reconcile any dispersed funds from the bank #2 core banking system 170 (this can occur once a day, in real time, or at configured intervals of time as agreed upon between bank #1 and bank #2).

Additionally, the not-on-us transaction can be viewed in real time by local tellers operating local teller terminals 117 through the branch server 115 of the bank #1 branch.

One now appreciates how remote assistance by staff of the customer's bank (as opposed to staff of the ATM owner's bank) to conduct a not-on-us transaction can occur between two different financial institutions. This alleviates customer concerns when a customer is traveling (perhaps in a country where the customer's language is not usually spoken) and when the customer's financial institution lacks a convenient presence (via ATMs) in frequented locations of the customer. These techniques provide a customer with the ability to perform his/her banking with remote teller assistance on any accessible ATM 111 enhanced with the inter-network not-on-us financial transaction processing discussed herein. Furthermore, the techniques allow banking systems to efficiently expose existing banking transactions (including remote teller assistance) via interactions with the new API 114-2 and through translation and conversion processing provided by the proprietary commands 114-1.

In other embodiments, the banks may agree on a new API that can interface directly to an ATM without requiring any conversion to a proprietary command format.

It is also noted that the bank #1 branch 110 can continue to operate in its normal and expected manner, providing that bank branch's native customers operating their ATM 111 with local teller assistance through local teller terminals 117 utilizing the branch server 115 and the routing server 114.

It should also be noted that conventional not-on-us ATM transactions can be performed by a customer without any assistance via the interchange network shown in the FIG. 1.

Thus, there is no disruption to the banking system associated with the ATM 111 and no disruption to normal operations of the bank #1 branch 110.

In an embodiment, at least one remote teller terminal 140 is a tablet.

In an embodiment, at least one remote teller terminal 140 is a laptop.

In an embodiment, at least one remote teller terminal 140 is a smart phone.

In an embodiment, at least one remote teller terminal 140 is a wearable processing device.

In an embodiment, at least one remote teller terminal 140 is a desktop computer terminal.

Some of the embodiments presented with the discussion of the FIG. 1 and other embodiments are now discussed with reference to the FIGS. 2-4.

Figure 2:
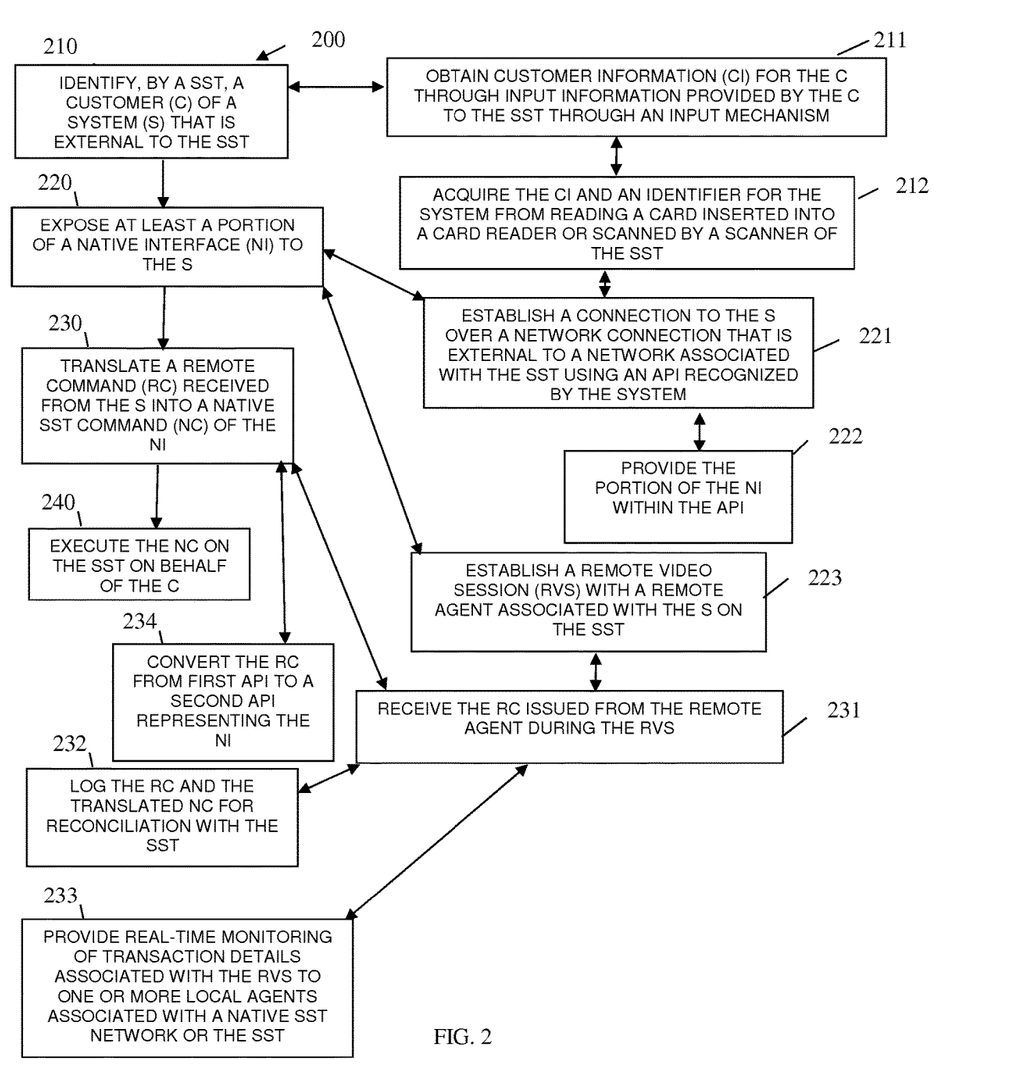
FIG. 2 is a diagram of a method for providing inter-network remote assist, according to an example embodiment.

FIG. 2 is a diagram of a method 200 for providing inter-network remote assist, according to an example embodiment. The software module(s) that implements the method 200 is referred to as a "transaction manager." The transaction manager is implemented as executable instructions programmed and residing within memory and/or a non-transitory computer-readable (processor-readable) storage medium and executed by one or more processors of one or more devices. The processor(s) of the device(s) that executes the transaction manager are specifically configured and programmed to process the transaction manager. The transaction manager has access to one or more network connections during its processing. The network connections can be wired, wireless, or a combination of wired and wireless.

In an embodiment, the devices that execute the transaction manager are the ATM 111 and the routing server 114 of the FIG. 1.

In an embodiment, the device that executes the transaction manager is a Self-Service Terminal (SST). In an embodiment, the SST is a kiosk. In an embodiment, the SST is a Self-Service Checkout Station.

In an embodiment, the transaction manager is the customer assist agent/interface 112 of the FIG. 1.

In an embodiment, the transaction manager is a combination of the customer assist agent/interface 112, the transaction manager 113, the proprietary commands 114-1, the new API 114-2, and the viewing/logging manager 160 of the FIG. 1.

At 210, the transaction manager identifies a customer of a system that is external to an SST. The system is external because it is not native to or is not typically available to the SST.

In an embodiment, the system is the bank #2 core banking system 170 of the FIG. 1.

In an embodiment, the system is associated with a vendor that wishes to makes services available to the SST that the vendor has never had services on before. In this way, the transaction interface provides a multivendor interoperability environment.

According to an embodiment, at 211, the transaction manager obtains customer information for the customer through input information provided by the customer to the SST through an input mechanism (touch screen selections, card swipe, card scan, voice, etc.).

In an embodiment of 211 and at 212, the transaction manager acquires the customer information and an identifier for the system from reading a card inserted into a card reader or scanned by a scanner of the SST. The card can be a bank card, a credit card, a loyalty card, and the like.

At 220, the transaction manager exposes at least a portion of a native SST interface to the system.

According to an embodiment of 220 and 212, at 221, the transaction manager establishes a connection to the system over a network connection that is external to a network associated with the SST using an API recognized by the system. In an embodiment, the API recognized by the system is the new API 114-2 of the FIG. 1.

In an embodiment of 221 and at 222, the transaction manager provides the portion of the native interface exposed to the system within commands provided in the API.

In an embodiment, at 223, the transaction manager establishes a remote video session with a remote agent associated with the system on the SST to facilitate the processing of a not-on-us transaction at the SST.

At 230, the transaction manager translates a remote command received from the system to a native SST command of the native SST. Use of the term "native" means that the SST is configured to recognize and process the native command.

In an embodiment of 230 and 223, at 231, the transaction manager receives the remote command issued from the remote agent during the remote video session. So, the remote agent is operating a device and interface of the system to conduct the remote video session and the remote agent issues the remote command during that remote video session to be executed on the SST on behalf of the customer as a not-on-us transaction.

In an embodiment of 231 and at 232, the transaction manager logs the remote command and the translated native command for reconciliation with the SST. This can be achieved through the viewing/logging manager 160 discussed above with the FIG. 1. A variety of other details may be logged as well, such as, but not limited to: a customer identifier, a SST identifier, a date and time, a day of week, a system identifier, transaction details (withdrawal of funds amount, etc.), and the like.

In an embodiment of 231 and at 233, the transaction manager provides real-time monitoring of transaction details associated with the remote video session to one or more local agents associated with a native SST network of the SST. Use of the term "native" means that the SST is configured for network communication with devices participating in the native SST network.

In an embodiment, at 234, the transaction manager converts the remote command from a first API to a second API representing the native SST interface. In an embodiment, the conversion is achieved through processing discussed above with respect to the proprietary commands 114-1 of the FIG. 1.

At 240, the transaction manager executes the native SST command on the SST on behalf of the customer. In an embodiment, the command is a not-on-us transaction, which means it was issued or directed for execution from a system that is external and/or foreign to the SST and a native network of the SST.

Figure 3:
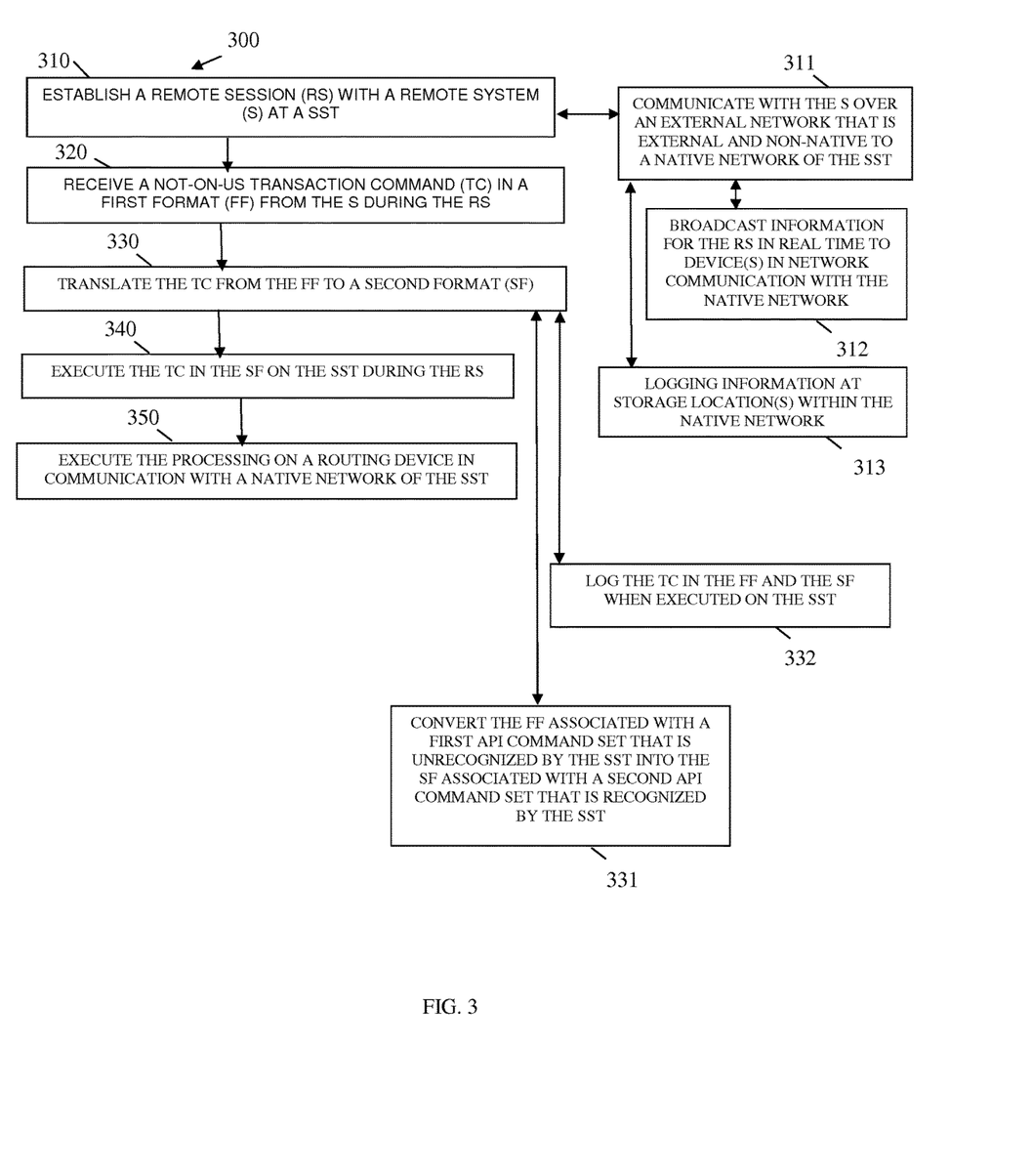
FIG. 3 is a diagram of another method for providing inter-network remote assist, according to an example embodiment.

FIG. 3 is a diagram of another method 300 for providing inter-network remote assist, according to an example embodiment. The software module(s) that implements the method 300 is referred to as a "not-on-us transaction manager." The not-on-us transaction manager is implemented as executable instructions programmed and residing within memory and/or a non-transitory computer-readable (processor-readable) storage medium and executed by one or more processors of a device. The processors that execute the not-on-us transaction manager are specifically configured and programmed to process the not-on-us transaction manager. The not-on-us transaction manager has access to one or more network connections during its processing. The network connections can be wired, wireless, or a combination of wired and wireless.

In an embodiment, the device that executes the not-on-us transaction manager is the routing server 114 of the FIG. 1.

In an embodiment, the device that executes the not-on-us transaction manager is a proxy. In an embodiment, the proxy is a transparent proxy. In an embodiment, the proxy is a forward proxy. In an embodiment, the proxy is a reverse proxy. In an embodiment, the proxy is a combination of both a forward proxy for interacting with an SST and a reverse proxy for interacting with a remote system.

In an embodiment, the not-on-us transaction manager is the combination of the proprietary commands 114-1, the new API 114-2, and viewing/logging manager 160 FIG. 1.

At 310, the not-on-us transaction manager establishes a remote session with a remote system at a SST.

In an embodiment, at 311, the not-on-us transaction manager communicates with the remote system over an external network that is external and non-native to a native network of the SST.

In an embodiment of 311 and at 312, the not-on-us transaction manager broadcasts information relevant to the remote session in real time to device in network communication with the native network of the SST. This permits monitoring (in real time) of any not-on-us transaction that takes place on the SST during the remote session.

In an embodiment of 311 and at 313, the not-on-us transaction manager logs information at one or more storage locations within the native network.

In an embodiment, the processing associated with 312 and 313 is performed by the viewing/logging manager 160 of the FIG. 1.

At 320, the not-on-us transaction manager receives a not-on-us transaction command in a first format from the system during the remote session. The first format is not recognizable by the SST for processing on the SST.

At 330, the not-on-us transaction manager translates the not-on-us transaction command from the first format to a second format (the second format recognized by the SST for processing on the SST). In an embodiment, the processing of 330 is performed by the proprietary commands 114-1 of the FIG. 1.

According to an embodiment, at 331, the not-on-us transaction manager logs the transaction command in the first format and the second format when executed on the SST.

In an embodiment, at 332, the not-on-us transaction manager converts the first format associated with a first API command set that is unrecognized by the SST into the second format associated with the second API that is recognized by the SST.

At 340, the not-on-us transaction manager executes the not-on-us transaction command in the second format on the SST during the remote session.

According to an embodiment, at 350, the not-on-us transaction manager is executed on a routing device (server, proxy, etc.) in communication with a native network of the SST.

Figure 4:
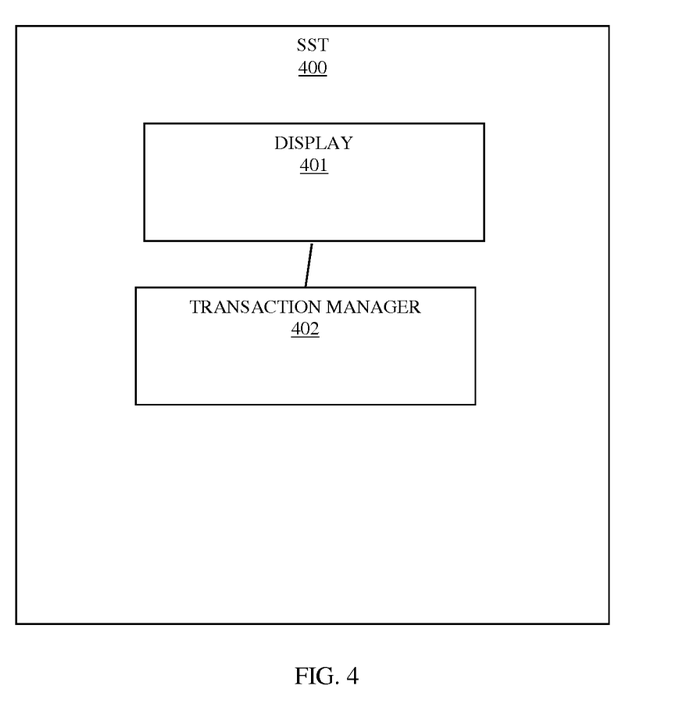
FIG. 4 is a diagram of a Self-Service Terminal (SST), according to an example embodiment.

FIG. 4 is a diagram of a Self-Service Terminal (SST) 400, according to an example embodiment. The SST 400 includes a variety of hard ware components and software components. The software components of the SST 400 are programmed and reside within memory and/or a non-transitory computer-readable medium and execute on one or more processors of the SST 400. The SST 400 communicates over at least two or more different networks, which can be wired, wireless, or a combination of wired and wireless.

In an embodiment, the SST 400 is the ATM 111 of the FIG. 1.

In an embodiment, the SST 400 is a kiosk.

In an embodiment, the SST 400 is a Self-Service Checkout Station.

The SST 400 includes a display 401 and a transaction manager 402.

In an embodiment, the display 401 is a touchscreen.

The transaction manager 402 is adapted and configured to: execute on the SST 400, interact with a customer operating the SST 400 to establish a remote assist session between the customer and a remote agent associated with a remote system, and process a not-on-us transaction issued from the remote agent during the remote assist session on the SST 400.

In an embodiment, the transaction manager 402 is further adapted and configured to interact with a routing server within a native network during the remote assist session to receive the not-on-us transaction in a native format recognized by the SST 400 for execution on the SST 400 when the not-on-us transaction is originally issued from the remote system associated with the remote agent in a non-native format that is unrecognizable by the SST 400.

In an embodiment, the remote system is bank #2 core banking system 170 of the FIG. 1.

In an embodiment, the SST 400 is configured to provide the processing associated with the method 200 and/or the method 300 of the FIGS. 2 and 3.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising: providing a routing server to a native network associated with a Self-Service Terminal (SST) that interconnects the native network to an external network during a request for assistance for a transaction being conducted on the SST that is associated with a foreign SST that is not associated with the native network and an SST system of the SST and the foreign SST is associated with a remote SST system, wherein the routing server is a proxy that establishes an inter-connection between the SST and the remote SST system during the transaction;

identifying, by executable instructions that execute on a hardware processor of the SST from a non-transitory computer-readable storage medium, a customer identifier for a customer from a card read by the SST during the transaction of the customer at the SST, determining from the customer identifier that the customer is associated with the remote SST system that is different from an SST system, wherein the remote SST system is: outside operational control of the SST system, foreign to the SST, and remote from the SST;

receiving, by the executable instructions, the request for assistance from the customer during the transaction;

forwarding, by the executable instructions, the request for assistance to the routing server;

exposing, in real time by the routing server, at least a portion of a native SST interface associated with the SST system to the remote SST system by exposing SST commands available on the SST to an Application Programming Interface (API) of the remote SST system over a network connection between the routing server and the remote SST system, wherein exposing further includes:

causing, by the routing server, the native SST interface of the SST to present an option on a display of the SST that allows a customer selection of that option to access the remote SST system from the native SST interface, and responsive to activation of the option by the customer provided by the SST, performing the exposing of the at least the portion of the native SST interface by the exposing of the SST commands to the API of the remote SST system over the network connection; and establishing a remote video session with a remote agent associated with the remote SST system on the SST;

translating, by the routing server, a remote command received from the remote SST system to a native SST command of the native SST interface, wherein the remote command is in a proprietary command format to the remote SST system, wherein translating further includes:

receiving the remote command issued from the remote agent during the remote video session;

providing real-time monitoring of transaction details associated with the remote video session to one or more local agents associated with a native SST network of the SST; and converting the remote command from the API to a second API representing the native SST interface;

providing, by the routing server, the native SST command to the SST;

executing the native SST command on the SST on behalf of the customer, wherein executing further includes processing, by the executable instructions, the native SST command during the transaction as a particular command that establishes a remote video session with an agent of the remote SST system; and processing, by the executable instructions, other remote commands received from the remote SST system through the API for the transaction based on the other remote commands being provided by the routing server, wherein at least one of the other remote commands comprises dispensing currency from the SST or accepting a deposit at the SST.

2. The method of claim 1, wherein exposing further includes establishing a connection to the remote SST system over the network connection that is external to a network associated with the SST using the API recognized by the remote SST system.

3. The method of claim 2, wherein establishing further includes providing the portion of the native interface within the API.

4. The method of claim 1, wherein receiving the remote command further includes logging the remote command and the translated native command for reconciliation with the SST.

5. A method, comprising:

providing a routing server to a native network associated with a Self-Service Terminal (SST) that interconnects the native network to an external network during a request for assistance for a transaction being conducted on the SST that is associated with a foreign SST that is not associated with the native network and an SST system of the SST and the foreign SST is associated with a remote SST system, wherein the routing server is a proxy that establishes an inter-connection between the SST and the remote SST system during the transaction receiving, by executable instructions that execute on a hardware processor from a non-transitory computer-readable storage medium of the SST, the remote assistance request at the SST, wherein receiving further includes presenting an option on a display of the SST, detecting activation of the option, wherein the option associated with the remote SST system that is: foreign to the SST, outside the operational control of the SST, and not associated with the SST system supported by the SST;

forwarding, by the executable instructions, the option to the routing server;

establishing, by the routing server, a remote session with the remote SST system at the SST based on activation of the option from the display by a customer operating the SST for the transaction at the SST, wherein establishing further includes establishing the remote session as a remote video session with a remote agent associated with the remote SST system on the SST;

receiving, in real time by the routing server, a not-on-us transaction command in a first format from the remote SST system during the remote session through an Application Programming Interface (API) recognized by the remote SST system over the remote session, wherein receiving further includes receiving the not-on-us transaction command from the remote agent during the remove video session;

translating, by the routing server, the not-on-us transaction command from the first format to a second format, wherein the not-on-us transaction command is in a proprietary command format to the remote SST system, wherein translating further includes converting the non-on-us transaction command from the API to a second API representing a native interface of the SST;

providing, by the routing server, the not-on-us transaction in the second format to the SST;

executing the not-on-us transaction command in the second format on the SST during the remote session and during the transaction at the SST by the executable instructions causing the not-on-us transaction to be processed on the SST, and wherein executing further includes providing real-time monitoring of transaction details associated with the remote video session to one or more local agents associated with the native network of the SST; and processing, by the executable instructions, other commands for the not-on-us transaction on the SST that are issued by the remote SST system through the API and provided in the second format by the routing server, wherein at least one of the other commands comprises dispensing currency from the SST or accepting a deposit at the SST.

6. The method of claim 5, wherein establishing further includes communicating with the remote SST system over an external network that is external and non-native to the native network of the SST.

7. The method of claim 6, wherein communicating further includes broadcasting information associated with the remote session in real time to one or more devices in network communication with the native network.

8. The method of claim 5, wherein communicating further includes logging the information at one or more storage locations within the native network.

9. The method of claim 5, wherein translating further includes converting the first format associated with a command set of the API that is unrecognized by the SST to the second format associated a second API command set that is recognized by the SST.

10. The method of claim 5, wherein executing further includes logging the not-on-us transaction command in the first format and the second format when executed on the SST.

11. A Self-Service Terminal (SST), comprising:
a display;
a hardware processor;
a non-transitory computer-readable storage medium having executable instructions representing a transaction manager; and
the transaction manager when executed by the hardware processor from the non-transitory computer-readable storage medium causes the hardware processor to:
establish a remote assist session as a remote video session with a remote agent associated with a remote SST system on the SST;
interact, in real time, with a customer and the remote agent using an Application Programming Interface (API) recognized by the remote agent during the remote assist session, responsive to an option presented on the display of the SST that is activated by the customer during a transaction at the SST, wherein the remote SST system is: foreign to the SST, outside operational control of the SST, not associated with an SST system supported by the SST, and external to the SST, wherein interaction for the remote assist session is provided through a routing server that is a proxy between the SST and the remote SST system;
process a not-on-us transaction received from the remote agent during the remote assist session on the SST and during the transaction at the SST as the remote agent issues a variety of agent-initiated commands that are in a proprietary command format to the remote agent during the remote assist session through the API and by converting the not-on-us transaction from the API to a second API representing a native SST interface, wherein the routing server provides translation of the not-on-us transaction and agent-initiated commands from the proprietary command format during the remote assist session to the SST in a native format recognized by the SST;
provide real-time monitoring of transaction details associated with the remote assist session to one or more local agents associated with a native SST network of the SST; and
process other commands issued from the remote agent through the API on the SST for the not-on-us transaction in the native format as provided by the routing server during the remote assist session, wherein at least one of the other commands comprises dispensing currency from the SST or accepting a deposit at the SST.

12. The SST of claim 11, wherein the SST is an Automated Teller Machine (ATM) and the remote SST system is banking system that is foreign to the ATM.

* * * * *